United States Patent [19]

Cox et al.

[11] Patent Number: 5,764,517
[45] Date of Patent: Jun. 9, 1998

[54] COMPUTER CARTRIDGES ASSEMBLY PROCESS LINE WITH INTEGRATED CLOSURE, WELD, AND MARKING STATIONS

[75] Inventors: Wilton Louis Cox; John Jacomino, Jr., both of Charlotte; Simon Yu, Harrisburg, all of N.C.

[73] Assignee: International Business Machines Corporation, Armonk, N.Y.

[21] Appl. No.: 636,053

[22] Filed: Apr. 22, 1996

[51] Int. Cl.⁶ .................................................. G06F 19/00
[52] U.S. Cl. ........................ 364/468.1; 29/428; 29/787
[58] Field of Search ........................ 364/468.01–468.24, 364/474.01, 474.02, 474.04, 474.08, 474.11, 476.01, 477.01, 477.06, 478.16, 478.17, 478.18; 29/787–790, 822, 428–431, 505, 507, 525

[56] References Cited

U.S. PATENT DOCUMENTS

| | | |
|---|---|---|
| 3,616,016 | 10/1971 | Dintner. |
| 4,090,295 | 5/1978 | Renbarger ................... 29/789 |
| 4,390,386 | 6/1983 | Bartl. |
| 4,872,941 | 10/1989 | Lippman et al. ........... 156/497 |
| 4,900,328 | 2/1990 | Breda et al.. |
| 5,170,031 | 12/1992 | Russell et al.. |
| 5,339,222 | 8/1994 | Simmons et al.. |
| 5,386,340 | 1/1995 | Kurz. |
| 5,414,597 | 5/1995 | Lindland et al.. |
| 5,463,531 | 10/1995 | Choon et al.. |
| 5,515,595 | 5/1996 | Kurz ........................... 29/509 |
| 5,548,485 | 8/1996 | Bethurum et al. ......... 361/737 |
| 5,617,627 | 4/1997 | Semple et al. ............. 29/509 |

OTHER PUBLICATIONS

IBMC, p. 56, 92–243171/30, *EP 495272–A1, Published 1992 Derwent Publication Ltd. Title: Component–joining assembly device.

IBM Technical Disclosure Bulletin vol. 37, No. 08, Aug. 1994, by Lawrence, Morene and Ridley, Title: Credit Card Adaptor Cover Set.

IBM Technical Disclosure Bulletin vol. 37, No. 08, Aug. 1994, by Lawrence, Mathewson and Steinbugler, Title: PCMCIA Wireless Wan Package.

*Primary Examiner*—James P. Trammell
*Attorney, Agent, or Firm*—Calfee, Halter & Griswold LLP

[57] ABSTRACT

A continuous process line for producing computer cartridges includes a closing station for squeezing cover portions of the cartridges together, followed by a connection station to permanently secure the cover portions together, followed by a station to mark the cartridges for identification. The closing station includes two low friction surfaces such as rollers and/or fixed slides with low friction surfaces, which taper together to close a partially folded one piece snap together PCMCIA card cover. The connection station includes a Nd:YAG laser welder with inert gas to laser weld lap joints at the seams of the snap-together cartridges. The marking station includes an applicator for applying pre-printed labels to the cartridges. An automatic controller senses the positions of the cartridges as they move down the line and initiates the securing and marking of the cartridges depending on the position of the cartridges.

17 Claims, 7 Drawing Sheets

COMPUTER CARTRIDGES ASSEMBLY PROCESS LINE WITH INTEGRATED CLOSURE, WELD, AND MARKING STATIONS

This document is protected by copyright except to the extent required by law to obtain and continue all available patent protection.

FIELD OF INVENTION

This invention relates to the field of computer cartridge production more specifically to the assembly of PCMCIA cards for lap top computers, but is not limited to such cartridges.

BACKGROUND

The following background is for convenience of those skilled in the art and for incorporating the listed citations by reference. The following is not an assertion that a search adequate for examination has been made, and is not an admission that any of the following citations are material or analogous art, or prior art.

Computer cartridges are well known in the art and have been used for many years for software and additional memory especially for low cost small systems and so called game systems. They allow the functionality of the computer system to be changed simply by replacing the cartridge. More recently these cartridges have become more popular for personal computer systems.

Typically computer cartridges include an organic circuit board assembly held in position by a thermoset epoxy frame filled with reinforcing fibers. The card and frame are enclosed by a top and bottom cover that are typically a molded thermoset. Also, an interface such as a circuit card edge at one end of the cartridge provides for connection to the computer system. The top and bottom covers are usually bonded together using an adhesive although welding has been suggested.

The well known Personal Computer Memory Card International Association (PCMCIA) standards specify physical and electrical characteristics for some types of computer cartridges and the interface between such cartridges and computer systems. The specification was published September 1991 and is available as issue PCMCIA PC Card Standard Release 2.0 from the association. Cartridges conforming to this standard may be used with any computer system having a PCMCIA interface and have become very popular for use in lap top or note book size personal computers. These cartridges are the size of a common credit card which is 54 mm by 85.6 mm (2.12"×3.37") but are thicker than credit cards. For this reason these types of cartridges are usually referred to as PCMCIA cards. The PCMCIA standard provides three standard thicknesses for cartridges. Type I cards are 3.3 mm (0.13") thick, type II cards are 5 mm (0.19") thick and type III cards are 10.5 mm (0.41") thick. Also, the standard provides for extended cards which are longer than 85.6 mm. The cards have proved useful by providing many types of additional functions for such computer systems including software, network interfaces, modems, flash memory, and hard drives.

The cards are typically assembled together by hand and placed in a jig or tooling which holds the covers in place during curing of the adhesive or welding of the cards.

U.S. Pat. Nos. 5,386,340 to Kurz; 5,463,531 to Choon; and 5,339,222 to Simmins disclose PCMCIA cards in which separate top and bottom covers are snapped together to form an enclosure. U.S. Pat. No. 5,386,340 discloses a one part cover that folds along a lateral edge and snaps together. "Credit Card Adapter Cover Set" by Lawrence et al., in *IBM Technical Disclosure Bulletin* Vol. 37 No. 08, p51–52, August 1984, discloses a PCMCIA card folded along a longitudinal edge.

U.S. Pat. No. 5,397,857 discloses a PCMCIA card in which separate covers are snapped over respective plastic frames and then the frames are sonicly welded together. "PCMCIA Wireless WAN Package" by Lawrence et al., in *IBM Technical Disclosure Bulletin* Vol. 37 No. 08 August 1984, discloses a PCMCIA card in which separate covers are stitch welded.

U.S. Pat. No. 5,170,031 to Russell discloses beam welding technology. U.S. Pat. No. 5,250,782 discloses a method of closing an electronic circuit package by welding. U.S. Pat. No. 5,414,597 discloses an electronic module in which separate top and bottom covers are attached by snapping to the frame and screwing together. U.S. Pat. No. 3,586,816 to Hagen suggests laser welding. U.S. Pat. Nos. 4,845,447 to Holdsworth and 4,386,388 to Beun suggest welding together covers. U.S. Pat. No. 5,354,964 to Kyoren suggests using inert gas during welding. U.S. Pat. No. 4,833,295 suggests welding of lap joints. U.S. Pat. No. 4,899,030 to Miyazaki suggests a high power density beam for welding. U.S. Pat. No. 4,873,415 to Johnson suggests a laser weld with weave pattern. U.S. Pat. No. 5,268,555 suggests a laser with fiber optic delivery system. U.S. Pat. No. 4,900,328 to Breda discloses a method for continuous assembly of heat exchanger pairs. EP 495272-A1 discloses a component assembly device showing tapering walls.

U.S. Pat. Nos. 3,616,016 to Dinter and 4,390,386 to Bartl discloses application of pressure-sensitive labels.

All the above citations are hereby incorporated in whole by reference.

SUMMARY OF THE INVENTION

A one piece cover assembly is partially folded and conveyed fold first, between two low friction boundaries such as a metal surface coated with a solid organic polymer, conveyer belt, and/or rollers. The boundaries taper from a wide entrance to a narrow exit to fold and squeeze top and bottom parts of the cover together to fully close the cover. While the surfaces are squeezed together, seams of the cover are tack welded preferably by a beam welder, most preferably by a laser welding machine to form welded computer cartridges, and a printed label is applied to the top and/or bottom of the welded computer cartridges.

Applicants' have discovered that covers can be snapped together, spot welded at lap joints, and labeled as the cards move continuously in a production line. More specifically, that an arrangement of rollers and/or fixed sliding surfaces may be provided for closing of folding snap together PCMCIA cards and for holding snap together lap joints for laser spot welding.

Other features and advantages of this invention will become apparent from the following detailed description of the presently preferred embodiments of the invention illustrated by these drawings.

ENABLING DESCRIPTION OF INVENTION INCLUDING BEST MODE

Figure 1:
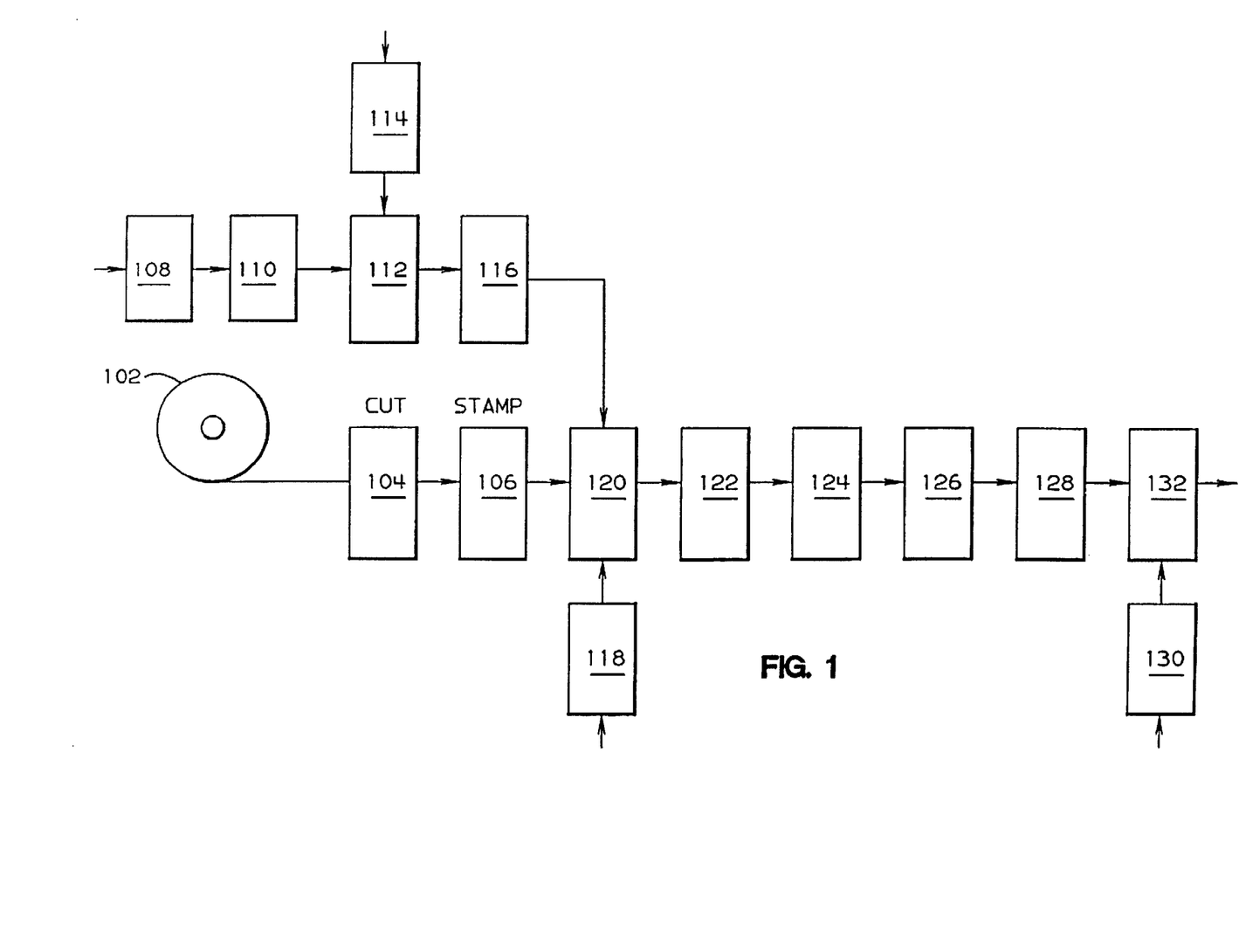
FIG. 1 is a block diagram of the continuous process line of the invention for producing computer cartridges.

FIG. 1 schematically shows a specific embodiment of continuous process line 100 of the invention for producing computer cartridges. Sheet metal 102 such as aluminum or more preferably, stainless steel is fed to cutting station 104 to produce blanks which are fed to stamping and folding station 106 to produce one piece folding computer cartridge covers, preferably snap together covers, most preferably forming lap joints. Circuitized organic substrates such as epoxy filled with fiberglass are provided by station 108 to screen printer 110 which squeegees solder paste through a mask onto pads on the circuit board substrates. The substrates are fed to pick-and-place machine 112. The pick-and-place machine receives electronic components from source 114 and places them on the substrates with component leads on the solder paste. The boards are conveyed through oven 116 to reflow the paste to form joints of solder alloy to produce assembled circuit boards. Alternately for some or all the components the pick-and-place machine may reflow heat solder on the leads of the component during placement. Frames are formed by molding organic polymer material filled with reinforcing fibers or particles (e.g. glass) in station 118. The circuit boards, covers, and frames are fed to assembly station 120 where the frames and circuit boards are inserted into the covers. The frames are partially folded at station 122 and then folded fully closed at station 124. The partial folding and full folding are performed in different steps because the full folding requires different manipulations and much more force than the partial folding. Then the cartridges are welded at station 126 and the cartridges are labeled at station 128. Any welding process such as resistance spot welding process which does not damage the electronic components of the card, may be used, but preferably, a beam welder is used.

Preferably, the beam welder includes a laser such as an Eximer laser or Co$_2$ Laser, or more preferably a Nd:YAG laser. Station 130 provides boxes to station 132 where the cartridges are boxed for shipping.

Figure 2:
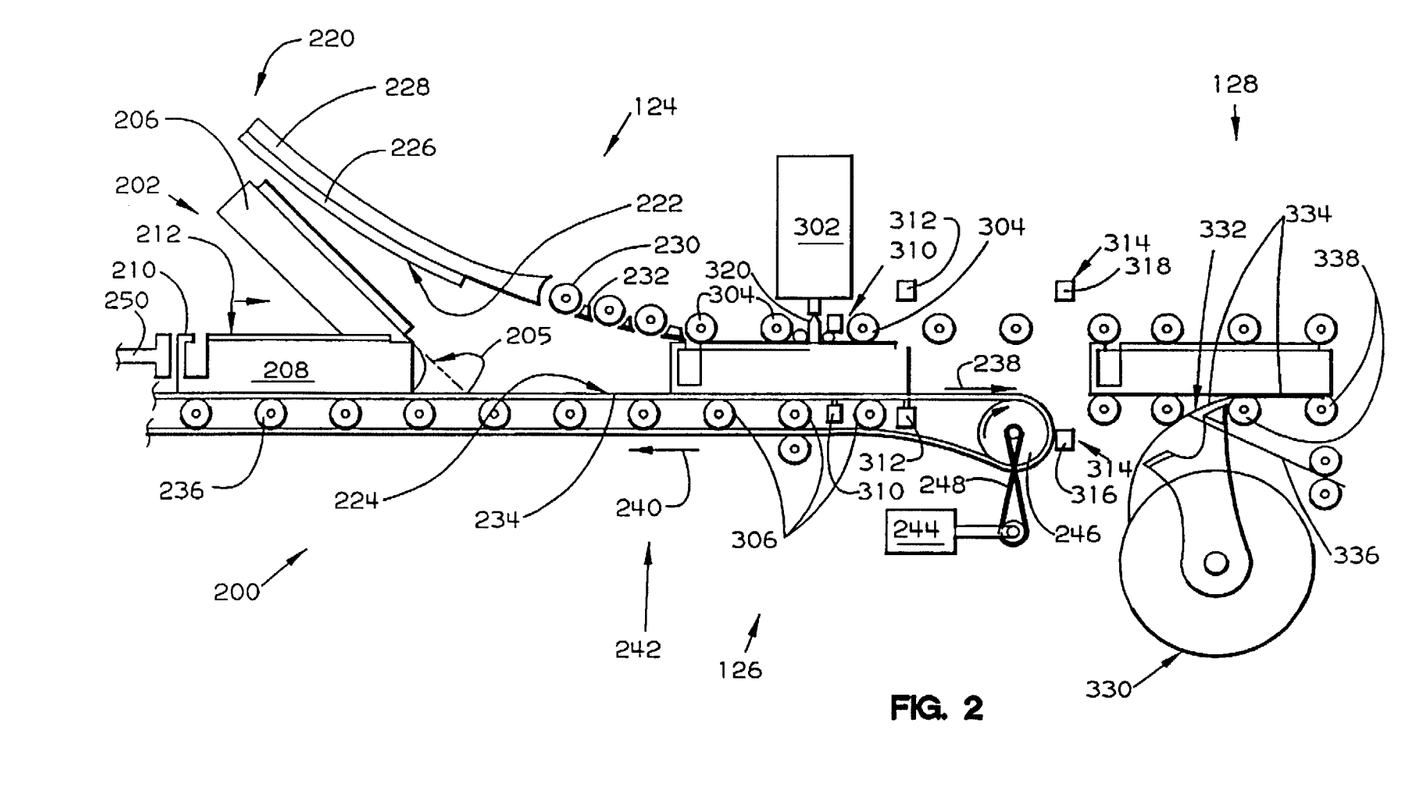
FIG. 2 schematically shows a portion of the continuous line of FIG. 1 which includes stations for closing computer cartridge covers, beam welding the seams of the covers, and applying a labels to respective assembled cartridges.

FIG. 2 schematically shows more details of section 200 of continuous process line 100 for producing computer cartridges. The section includes stations 124 for fully closing the cartridges, station 126 for welding the seams of the covers, and station 128 for labeling the cartridges. At the beginning of this section at closing station 124, computer cartridge 202 has a one piece cover which is partially folded closed. The cover is preferably partially folded at an angle as shown by arrow 205, between 90° to 160° which requires much less force than the snap closure. The cartridge is in an inverted position with bottom part 206 of the cover above top part 208 of the cover. The frame and circuit board are assembled in the bottom part. The top cover 208 includes snap flange 210 at one end and snap flanges 212 along both longitudinal sides.

Cartridge 202 is positioned at entrance 220 of a pair of confronting tapered boundaries including top boundary surface 222 and bottom boundary surface 224. The entrance is sufficiently wide to admit the partially closed cartridges. A portion of the top boundary surface is formed by low friction organic polymer layer 226 such as Nylon or Teflon which coats metal frame or plate 228. Another portion of the top boundary is formed by metal rollers 230 and Polymer coated metal spacers 232. The bottom boundary surface is formed by endless conveyer belt 234 supported by metal rollers 236. The conveyer belt may be formed by wire mesh (not shown) coated with a high friction organic polymer such as rubber. The conveyer belt moves in a direction shown by arrows 238, 240 to move the computer cartridges from wide entrance 220 to narrower exit at 242. Motor 244 is connected to end roller 246 for the conveyer belt by transmission 248 such as pulleys, chains, or gears to drive the roller for moving the conveyer belt. The narrower exit is approximately the width of a closed cartridge or slightly smaller to squeeze the closed cartridge. Ram 250 may be activated by a pneumatic or hydraulic motor such as a piston and cylinder to help move the cartridge through the closing station.

Figure 3:
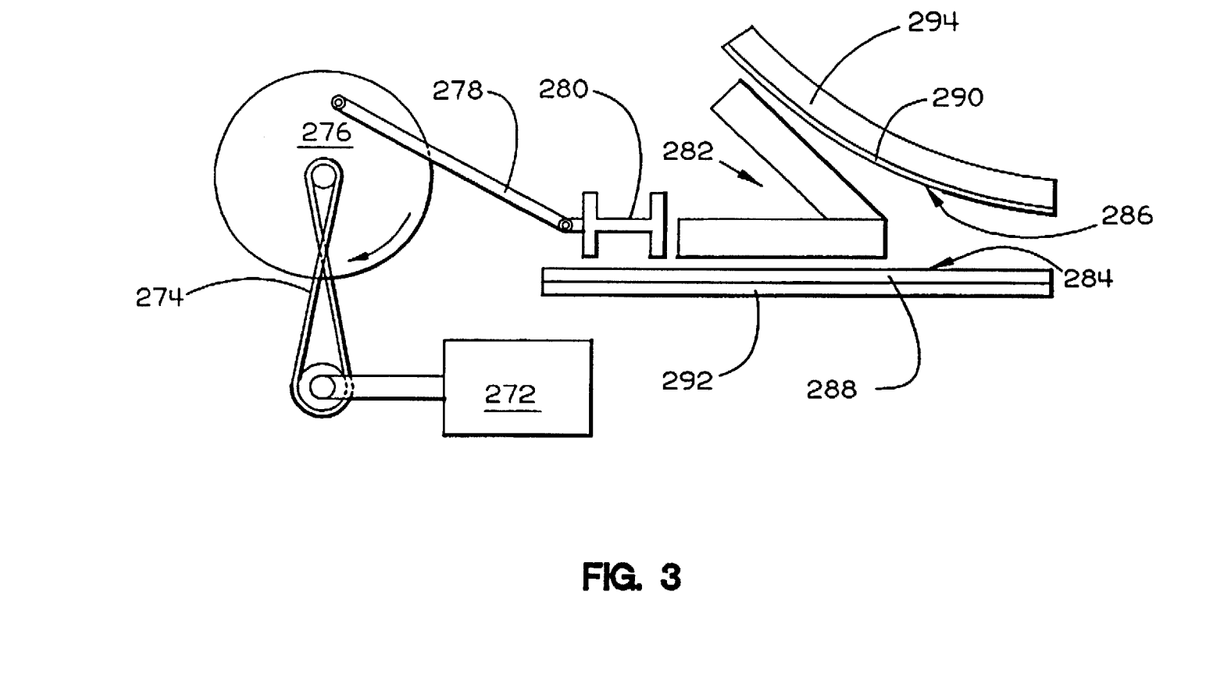
FIG. 3 schematically shows an electric motor driving a wheel and crank mechanism to drive a ram for moving the cartridges between tapering surfaces.

FIG. 3 shows alternative apparatus for closing station 124. Motor 272 is connected to transmission 274 such as belts or chains to wheel 276 to spin and drive crank 278 to move ram 280 to push cartridge 282 through the closing station. The closing station includes two boundaries 284,286 that taper together from a wide entrance to a narrow exit to close the cartridges. The boundaries are defined by layers of organic polymer 288,290 covering a steel frame 292,294. Ram 280 may be used alone as shown in FIG. 3 or used in combination other conveying apparatus such as the conveyer belt, such as ram 250 in FIG. 2.

In FIG. 2, printing station 128 may be placed before welding station 126 but when the welding may damage the printing then it is preferable to place the welding station before the printing station. In this specific embodiment the closing station is followed immediately by welding station 126.

In welding station 126, welding head 302 of an Nd:YAG laser welding machine directs beams to weld together lap seams between the top and bottom portions of the one piece folded cover. In this embodiment top rollers 304 and bottom rollers 306 firmly squeeze the cartridge to hold the lap seams in precise position for welding. Conveyer belt 234 moves the cartridge through the welding station. Sensors 310,312,314 determines the precise location of the cartridge for tack welding the seams. The sensors may be mechanically activated such as contact, capacitance, or optical switches' or may be magnetic proximity detectors, but preferably the sensors optically detect the cartridges directly. Each sensor includes source 316 of radiation such as electromagnetic radiation preferably infrared light, and detector 318 which detects the radiation. A cartridge is sensed when the cartridge blocks the radiation path between the source and radiation detector. Although only one laser head is shown a pair of heads may be used for each respective side of the cartridge. More preferably the welder is a laser and one or more optic cables 320 direct laser beams as required.

In printing station 128, preprinted labels are loaded into label applicator 330. At 332 labels 334 are separated from a continuous support sheet 336. The labels are pressure sensitive and are permanently fixed to the cartridge by roller 338 which applies pressure to expel any air between the label and cartridge.

Figure 4:
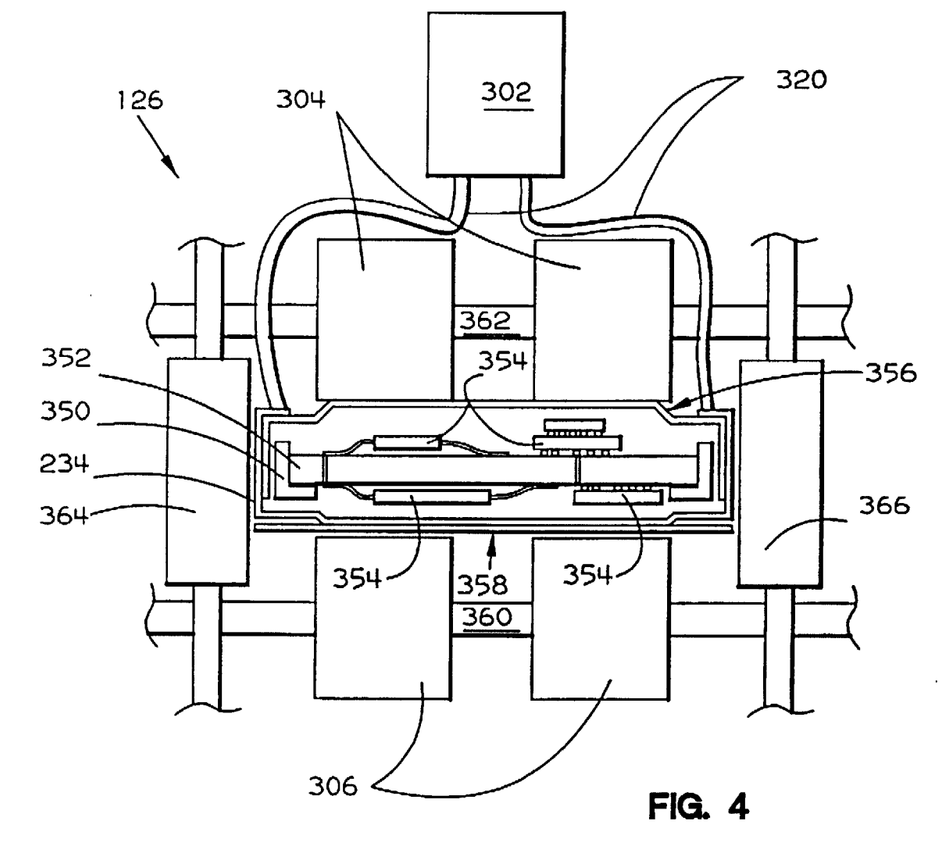
FIG. 4 shows a partial cross section of the embodiment of FIG. 2 near the welding station with rollers holding the seams in precise position.
Figure 5:
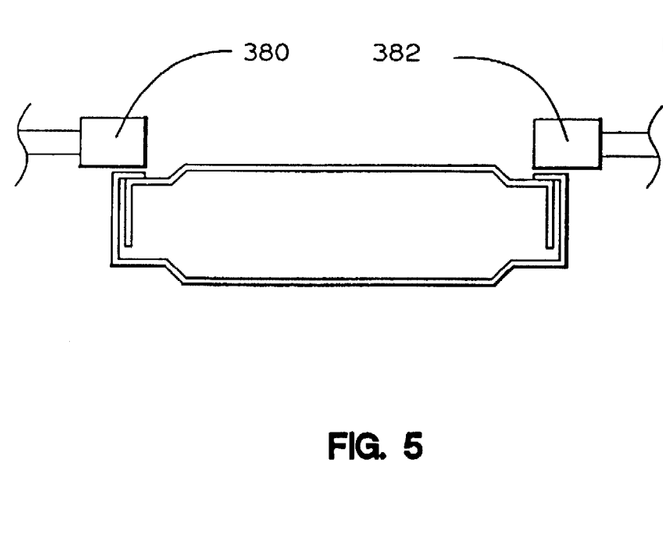
FIG. 5 shows another cross section of the embodiment of FIG. 2 near the welding station with additional rollers.

FIG. 4 shows an partial cross section of a portion of continuous process line 100 near welding station 126. Plastic frame 350 supports circuitized substrate 352 on which components 354 are mounted to form an electronic interconnect assembly. The frame and interconnect assembly are enclosed between bottom part 356 of the cover and top part 358 which snaps over the bottom part. Bottom rollers 306 mounted on axal 360 support conveyer belt 234 which moves the cartridge through the welding station. Top rollers 304 mounted on axal 362 hold the cartridge in precise vertical position for welding. Side rollers 364,366 hold the cartridge in precise horizontal position for welding. As shown in FIG. 5, seam rollers 380,382 may also be provided at the welding station before and/or after the welding station, to hold the seams tightly closed in precise position.

Figure 6:
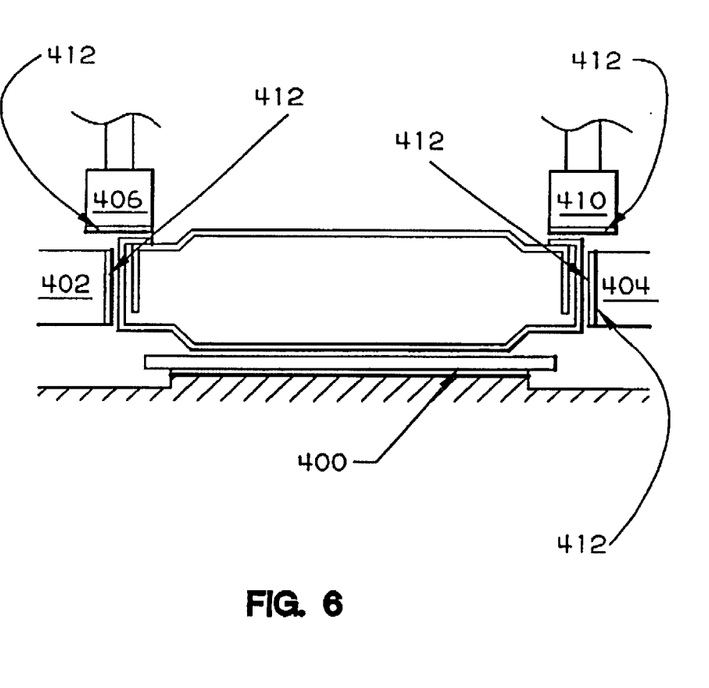
FIG. 6 shows an alternative embodiment of a cross section near the welding station of FIG. 2 showing surfaces for holding the seams in precise position for welding.

FIG. 6 shows an alternate embodiment of the apparatus for holding the seams in precise position. Surface 400 supports the conveyer belt, side surfaces 402,404 and top surfaces 406,408 hold the seams in precise position. Preferably the surfaces include frame or substrate 410 which may be a rigid organic material or a metal, covered with a layer 412 of an organic polymer material with low friction to metal such as Nylon or Teflon.

Figure 7:
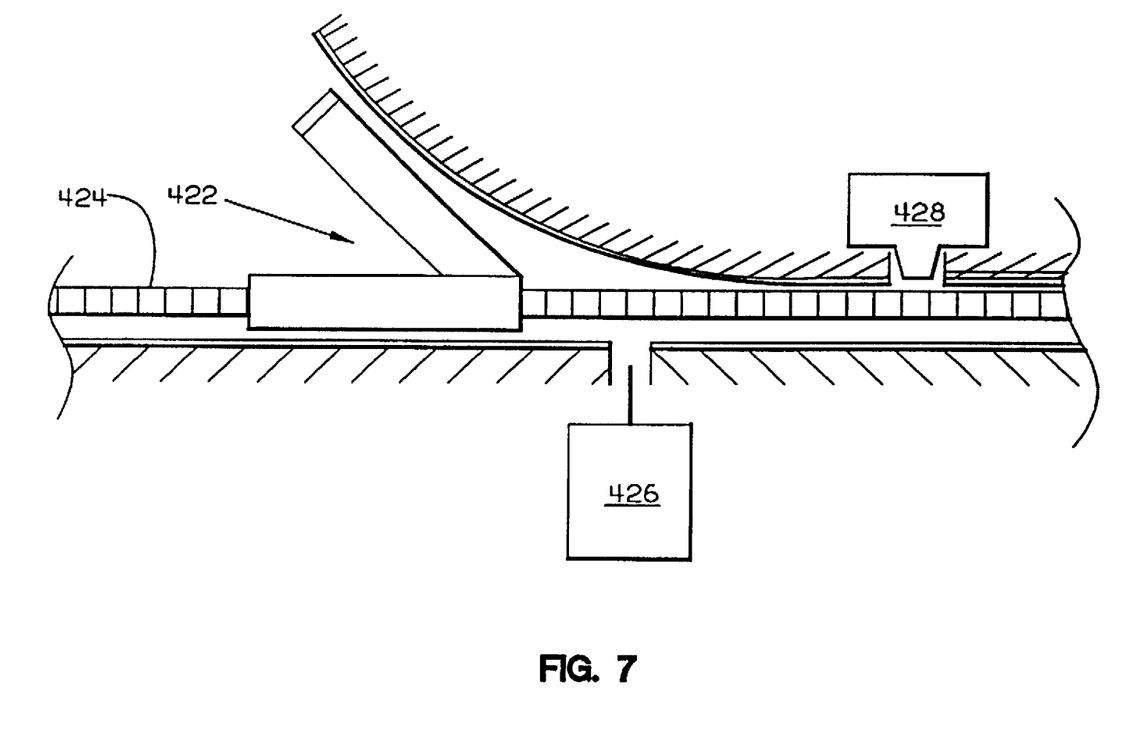
FIG. 7 schematically shows another embodiment of a section of the continuous line similar to the section shown in of FIG. 2, with a chain drive and surfaces of metal coated with organic polymer.

FIG. 7 shows another specific embodiment in which cartridge 422 communicates with chain conveyer 424 which moves the cartridges through the closing, welding, and printing stations of the continuous process line of the invention. The communication may include a clip on the chain or a bar extending from the chain to move the cartridges. In this embodiment the cartridge is right side up so that beam welder 426 is below the process line and printer station 428 is above the line. In this embodiment the tapered boundary surfaces are metal frames coated with a low friction solid organic polymer coating.

The printer 428 in this embodiment utilizes offset printing or color laser printing to print directly onto the top of the card or onto a label placed onto the cover prior to closing the cover.

Figure 8:
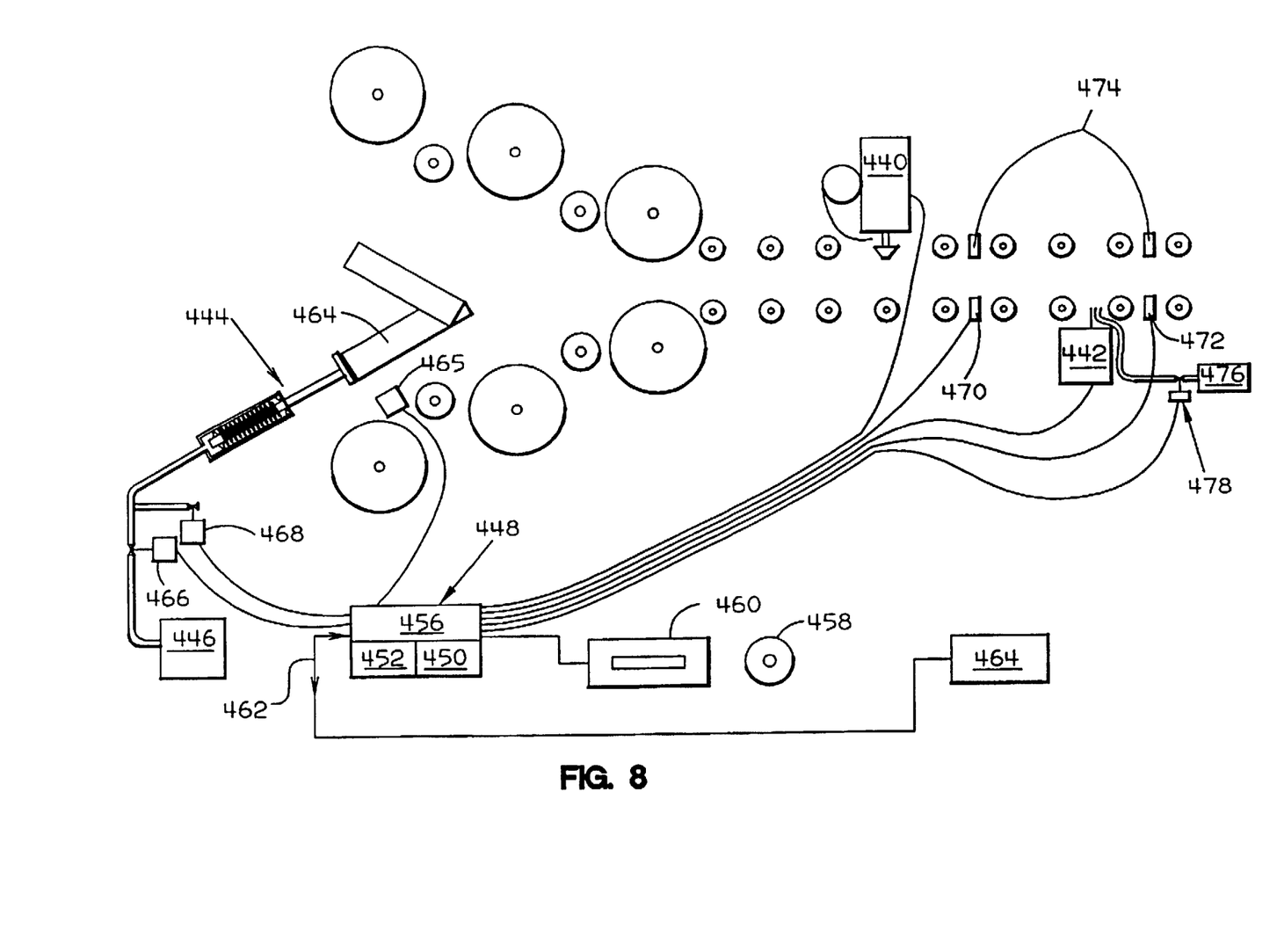
FIG. 8 schematically shows another embodiment of a section of the continuous line similar to that shown in FIG. 2, with surfaces defined by driven rollers to move the cartridge through the system.

FIG. 8 shows another specific embodiment in which all the boundary surfaces are defined by driven rollers. Printer 440 is in the line before welder 442. The printer uses a beam to write directly on the stainless steel material of the cartridge.

Pneumatic ram 444 is connected to source of pressurized gas 446 such as an air compressor to move the cartridge between the tapering boundaries.

Information handling system 448 such as a programmable controller or workstation, includes central processing unit 450 and memory unit 452 such as DRAM, SRAM, and/or ROM, and I/O unit 456 which communicates with elements of the system. Computer 448 may be programmed locally by introducing media 458 such as a floppy disk, optical disk, or computer cartridge into interface unit 460 or by network connection 462 such as a modem connection to a phone system to remote computer system 464 of the network. Controller 448 may communicate to control valve motors 466, 468 to activate ram 444, when a cartridge is in position for closing. The controller is also connected to sensors 470, 472 which detect radiation from respective sources 474 to determine when the cartridge is in position for labeling and welding respectively. The computer is also connected to the welder and labeler to regulate their activation depending on the sensor input to the computer. Preferably there are multiple position sensors at the welding station for determining multiple positions of the cartridge for making multiple tack welds along the seams of the cartridge.

Inert gas such as nitrogen or argon is provided from source 476 for providing an inert atmosphere at the laser welding machine. The computer communicates with control valve motor 478 to regulate the inert gas flow to the laser welder and conserve the gas between laser welds. Preferably, a sensor is provided to detect the cartridge before it reaches welding position and the gas starts to flow shortly before welding starts in order to establish a substantially oxygen free atmosphere (to prevent discoloring or damaging the metal) at the welding position before welding starts.

The computer system determines when the cartridge is in position for closing and regulates the motor for moving the cartridge through the closing station. Then the system determines when the cartridge is reaching welding position and opens the control valve for the inert gas. Then the system determines when the cartridge is in each position for welding and activates the welding machine in coordination with cartridge movement to weld the cartridge. The computer determines when the cartridge is in position for labeling and activates the labeler to mark the cartridge.

While the inventions of Applicants have been described in terms of preferred embodiments, various modifications of the inventions may be made by those of ordinary skill in the art within the spirit and scope of the inventions as other discoveries are made. Thus, the scope of the inventions are only limited by the following claims.

We claim:

1. A system for fully closing covers of computer cartridges, comprising:

a top and a bottom confronting low friction boundaries tapering together from a entry with a separation sufficiently wide to admit partially closed covers, to an exit with a narrower separation sufficiently narrow to fully close the covers; and means for automatically moving computer cartridges with covers through the system, between the boundaries, from the entry through the exit to fully close the covers.

2. The system of claim 1 in which:

the covers are one piece with the top portion and bottom portion seperated by a fold portion and the entry is wide enough to admit partially folded covers and the means for moving the cartridges moves the cartridges fold first;

the top and bottom boundaries are fixed in a direction perpendicular to the boundaries;

the narrow separation at the exit approximately as thick as fully closed cartridges;

the top boundary includes a low friction surface;

the low friction surface includes a metal plate covered with a low friction, organic, polymer material;

the low friction, organic, polymer, material includes Teflon or Nylon;

the top boundary includes multiple undriven rollers that roll directly against a top of the cover;

the top boundary defines a curved shape;

the bottom boundary is nearly flat;

the bottom boundary includes multiple undriven rollers;

the bottom boundary includes a conveyer belt supported by the undriven bottom rollers and against which the bottom rollers roll and that applies a friction force to a bottom of the cover to move the computer cartridges between the boundaries;

the means for moving include: an electric motor with means for connection to a source of electricity; and means for driving at least one set of rollers with the motor to move the conveyer; and the means for moving include a pneumatic ram.

3. The system of claim 1 in which:

the bottom boundary includes multiple driven rollers that roll directly against a bottom surface of the cover to move the cover through the system;

the means for moving include ram means for pushing the cartridges through the system;

the ram means include a wheel and crank mechanism and a motor driving the wheel to rotate.

4. The system of claim 1 in which:

the bottom surface includes a metal frame covered with a low friction organic polymer against which the cartridges slide; and the means for moving include a chain conveyer communicating with the cartridges.

5. A method for providing apparatus to produce computer cartridges, comprising the steps of:

providing top and bottom confronting low friction boundaries tapering from a entry with a wide separation to an exit with a narrow separation;

providing means to supply computer cartridges with partially closed covers to the boundaries; and providing means for automatically moving computer cartridges through the system, partial fold first, between the boundaries, from the entry through the exit to fully close the covers.

6. A method for producing computer cartridges, comprising the steps of:

providing a metal cover with a top cover part and bottom cover part wherein the covers are one piece and formed by stamping a portion of a stainless steel sheet to form a one piece snap-shut cover;

marking the cover to identify the product by attaching a preprinted label to both the top cover part and the bottom cover parts;

providing an electronic interconnect structure with a connector at one end of the structure wherein the step of providing an electronic interconnect structure includes providing an organic substrate with one or more copper wiring layers including surface contacts; providing surface mount components; mass soldering terminals of the surface mount components to the contacts;

a PCMCIA connector at one end of the substrate and attaching the connector to one or more of the wiring layers;

inserting into the top or bottom cover parts, the electronic interconnect structure with the connector at one end of the respective cover part so that the cover is partially folded through a fold part connecting between the top and bottom covers at least about 90° through a fold part connecting between the top and bottom covers;

providing a top and a bottom confronting low friction boundaries tapering from an entry with a wide separation to an exit with a narrow separation;

providing means for moving the computer cartridges from the entry through the exit wherein the covers are moved fold first through the system;

moving the partially folded cover between the low friction boundaries, fully fold close the top and bottom cover parts together to enclose the interconnect structure with the connector at an opening through the cover;

permanently securing the top and bottom cover parts together to produce the cartridge;

the step of permanently securing the cover parts together includes interference extensions on walls of the top or bottom part of the cover to snap over the other part of the cover;

the step of permanently securing the cover parts together includes beam welding the parts together at lap joints connecting the top and bottom parts;

the step of beam welding includes tack welding two or more lap joints at two or more locations along each joint;

the step of beam welding includes laser welding; and the step of beam welding occurs as the covers are moving through the system.

7. A system for welding computer cartridge assemblies, comprising:

means including confronting, low friction top and bottom boundaries that taper together, for squeezing a top part and a bottom part of a cover of the computer cartridges together as the cartridges move between the boundaries to precisely position a joint between the top and bottom parts;

means for automatically moving the computer cartridges through the system between the boundaries; and means for welding the top and bottom parts of the computer cartridges together as they are squeezed between the top and bottom boundaries.

8. The system of claim 7 in which:

the cover is one piece and the system further includes means for partially folding the top and bottom parts together;

the means for squeezing include rollers defining a part of at least one of the boundaries;

the cover is in contact with one or more of the rollers as the cover is squeezed;

the means for squeezing include a metal surface covered with a low friction, solid, organic polymer defining a part of at least one of the boundaries;

the cover is in contact with one or more covered, fixed, metal surfaces as its squeezed;

the means for squeezing include a conveyer belt defining the bottom boundary, extending over bottom rollers, supporting the top part of the cover;

the means for squeezing include side supports extending against the side walls along edges of the cover;

the means for automatically moving the computer cartridges include: an electric motor with means for connecting to a source of electricity; and means for driving one or more of the bottom rollers with the motor;

the means for welding include a beam welding machine;

the beam welding machine includes a laser welder;

the laser welder includes a Nd:YAG laser;

the beam welding machine is sufficiently high speed to tack weld the cover as it moves continuously between the confronting boundaries;

the system further includes a sensor to determine the precise position of the cover along a path of movement between the boundaries;

the sensor includes mechanical switches;

the sensor includes a source of radiation and a detector of the radiation;

the system further includes means for marking the cartridges after the welding; and the means for marking include a pressure sensitive label applicator.

9. A method for providing a system for welding computer cartridges, comprising the steps of:
providing confronting, low friction top and bottom boundaries that squeeze a top part and a bottom part of the computer cartridges as the cover moves between the boundaries to precisely position a joint between the top and bottom parts, with respect to a direction perpendicular to a plane of the computer cartridges;
providing means to automatically supply computer cartridges to the boundaries;
providing means for automatically moving the computer cartridges between the boundaries; and
providing a beam welding machine for welding the top and bottom parts of the computer cartridges together as they are squeezed between the top and bottom boundaries.

10. A method for producing secured computer cartridges, comprising the steps of:
providing an electronic interconnect structure with a connector at one end of the structure;
providing metal covers with an opening at one end;
enclosing the electronic interconnect structure in the metal cover with the connector at one end of the cartridge;
providing a top and a bottom confronting low friction boundaries tapering from an entry with a wide separation to an exit with a narrow separation;
providing means for moving the computer cartridges with partially folded covers from the entry through the exit;
automatically moving the partially folded cover between the low friction boundaries, folded part first, to fully fold the top and bottom cover parts together to enclose the interconnect structure with the connector at an opening through the cover;
automatically permanently securing the top and bottom cover parts together to produce the cartridge; and
securing a label to the top and bottom of the cartridge.

11. A PCMCIA cartridge production line, comprising in combination:
means for moving PCMCIA cartridges at a continuous speed through the line;
means for squeezing the cartridges to close the cartridges;
means for permanently securing the closure of the cartridges while they continue to be squeezed;
automatic means for marking the closed cartridges as they move down the line;
first automatic sensor means for determining that the cartridge is in position for permenant securing;
second automatic sensor means for determining that the cartridge is in position for marking;
an automatic control system to initiate the permanent securing and marking of the cartridges depending on the automatically determined cartridge position.

12. An information handling system for operating computer cartridge assembly lines including closing station, welding station, and marking station, the system comprising:
one or more central processing units;
programmed memory means for directing the operation of the central processing units;
means for automatically communicating with peripheral components including means for interrupting the operation of the central processing units depending on signals received from peripheral components;
means for automatically regulating the movement of computer cartridges through the stations;
means for automatically determining the presence of a computer cartridge at one or more welding positions at the welding station;
means for automatically initiating welding of the computer cartridge depending on the determination of computer cartridge presence at each of the welding positions at the welding station;
means for automatically determining presence of a computer cartridge at a labeling position at the marking station;
means for automatically initiating marking of the computer cartridge depending on the determination of presence of the computer cartridge at the marking.

13. The system of claim 12 in which there are two or more positions for welding at each welding station.

14. A method of operating a computer cartridge assembly system including a welder and labeler, comprising the steps of:
regulating continuous movement of computer cartridges through the system;
automatically detecting presence of a computer cartridge in one of one or more positions at the welder for tack welding;
automatically tack welding along one or more seams of the computer cartridge as the cartridge moves continuously through the system, depending on the detection of presence of the cartridges at one of the positions for tack welding;
automatically detecting presence of a computer cartridge at the labeler in position for marking; and
automatically marking the computer cartridge as the cartridge moves continuously though the system, depending on the detection of cartridge presence.

15. Apparatus for programming a computer system, comprising:
means to program the system for automatically determining presence of a computer cartridge at one or more welding positions at a welding station;
means to program the system for automatically initiating welding of a computer cartridge depending on the determination of computer cartridge presence at each of the welding positions at the welding station;
means to program the system for automatically determining the presence of a computer cartridge at a labeling position at the labeling station;
means to program the system for automatically initiating marking of the computer cartridge depending on the determination of presence of the computer cartridge at the labeling position.

16. The apparatus of claim 15 in which:
the apparatus consisting essentially of computer media for generating signals to program the computer system.

17. The apparatus of claim 15 in which:
the apparatus consisting essentially of a computer system with programmed means for networked communication with another computer system and programmed means for automatically programming the other computer system.

* * * * *